H. K. HITCHCOCK.
APPARATUS FOR GRADING MATERIALS.
APPLICATION FILED JULY 19, 1907.
934,611.
Patented Sept. 21, 1909.
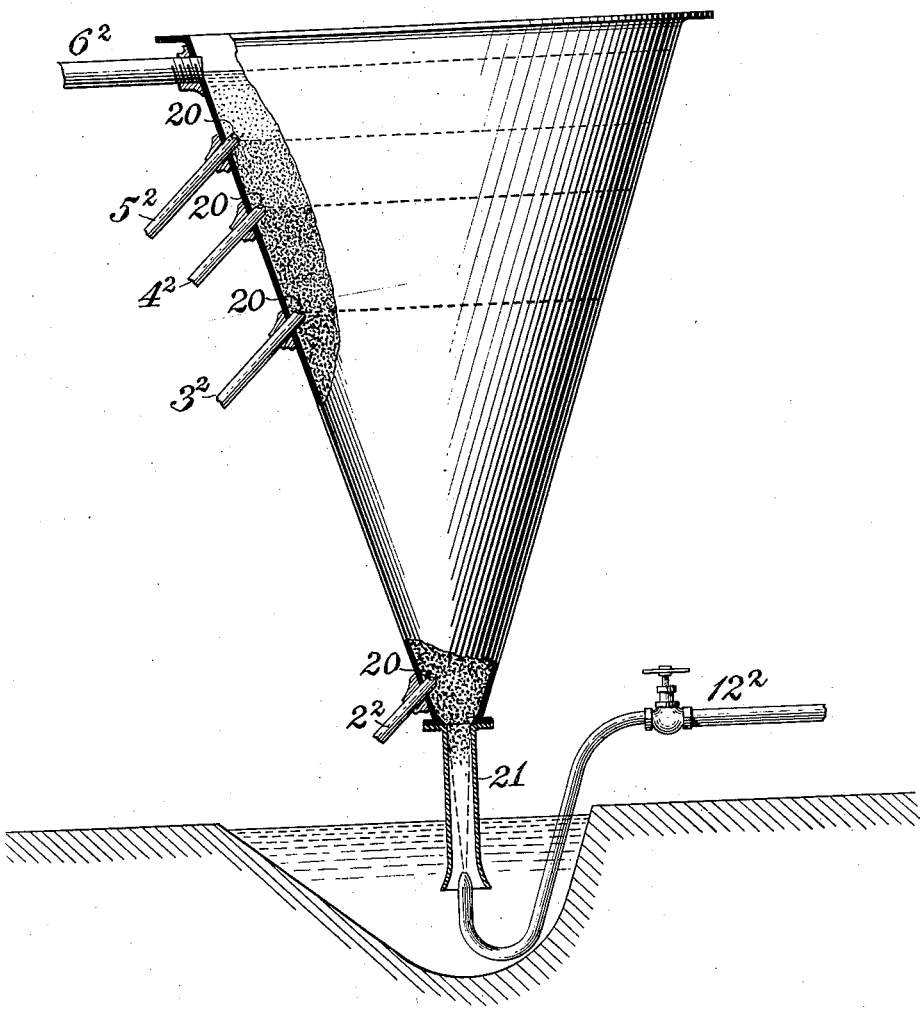
WITNESSES
INVENTOR

UNITED STATES PATENT OFFICE.

HALBERT K. HITCHCOCK, OF TARENTUM, PENNSYLVANIA.

APPARATUS FOR GRADING MATERIALS.

934,611. Specification of Letters Patent. Patented Sept. 21, 1909.

Application filed July 19, 1907. Serial No. 384,638.

*To all whom it may concern:*

Be it known that I, HALBERT K. HITCHCOCK, a citizen of the United States, residing at Tarentum, in the county of Allegheny and State of Pennsylvania, have invented certain new and useful Improvements in Apparatus for Grading Materials, of which the following is a specification.

My invention relates to apparatus for separating finely divided material comprising particles having different physical characteristics into grades each of which includes those particles having similar physical characteristics, and is applicable, for example to the grading of material used as abrasives such as are employed in the grinding of glass or other substances, the binders used in ceramics, and in fact to the grading of any finely divided material whatever, which it is desired to separate into grades. The invention has for its primary objects: the provision of a simple and compact apparatus wherein the separation of the divided material into various grades required may be accomplished more conveniently and rapidly than has been heretofore the case; and to provide an apparatus in which the separation into grades is accomplished with certainty and accuracy and wherein there is no waste of material. One embodiment of the invention is illustrated in the accompanying drawings, wherein:—

The figure is a side elevation of the apparatus partially broken away.

For the sake of definite illustration, the apparatus is shown and hereafter described as applied to the grading of the abrasives used in glass grinding, but it will be understood that the apparatus is applicable to the grading of any finely divided material whatsoever, and that the scope of invention is not limited to the grading of any particular material, but is coincident with the statement of invention and claims. Briefly stated, the apparatus comprises a tank having an admission opening at the bottom and means for giving an upward flow of liquid through the admission opening, together with a series of exit passages at different levels on the tank for conducting away the various strata of fluid. The fluid passes upwardly from the bottom of the tank at a constantly decreasing velocity thereby counterbalancing the normal downward velocity of the particles of material when falling in the liquid, and holding them in suspension at predetermined positions in the tank, which positions depend upon the upward velocity of the liquid, the resistance of the particles and the weight of the particles. The particles in which the ratio of the weight to the resistance of the liquid is largest, take the lowest positions, as the normal downward velocity of a particle through the water depends upon this ratio, which ratio in particles of the same shape and density increases with the size of the particles. The larger, denser and more compact particles thus come to a position of equilibrium in a stratum in the bottom of the tank where the upward velocity is greatest, while the other particles arrange themselves in a series of strata, the ratios of weight to resistance of the particles composing which strata, decrease as the distance from the bottom of the tank increases.

The apparatus illustrated is designed for a continuous operation wherein the flow of the mixture of material and water into the bottom of the tank is continuous and the outflow from the various discharge pipes is also continuous instead of intermittent as in the structure shown. In this operation the pipes $2^2$, $3^2$, $4^2$ and $5^2$ are extended into the tank and provided with small openings 20, so that a very small percentage of the liquid flowing in at the bottom of the tank is discharged at such discharge openings, the combined capacity of these openings being small as compared with the capacity of the admission tube 21 and the bulk of liquid passing out at the overflow pipe $6^2$. This is obviously desirable in order to prevent an undue proportion of the finer material from being diverted during its upward movement and being discharged at an opening below its position of equilibrium. The steam injector $12^2$ is provided, which injector forces the mixture of material and water upward through the admission tube 21 from the pit shown. In this form of apparatus the character of the original mixture has little or no effect upon the various grades, as the proportion of material to water is so small that any change in interstitial space and resultant change in velocity due to a change in the character of the material is very slight.

Having thus described my invention and illustrated its use, what I claim as new and desire to secure by Letters Patent is the following:—

1. In combination, a grading tank with downwardly converging sides and having an admission passage to the lower portion thereof and having a plurality of discharge passages at different levels of small combined capacity as compared with the capacity of the admission passage, and means for securing a continuous flow of liquid containing in suspension divided material to be graded up through such passage and the tank.

2. In combination, a grading tank with downwardly converging sides and having an admission passage to the lower portion thereof and a plurality of discharge pipes at different levels having passages therein of small combined capacity as compared with the capacity of the admission passage, and of smaller capacity than that of the pipes themselves, the height and width of the cross sections of said passages being approximately the same, and means for securing a continuous flow of liquid containing in suspension divided material to be graded up through the admission passage and the tank.

3. In combination, a grading tank with downwardly converging sides and having an admission passage to the lower portion thereof, and a plurality of discharge pipes at different levels having their ends projecting inward past the inside surface of the tank and having passages of small combined capacity as compared with the capacity of the admission passage, and means for securing a continuous flow of liquid containing in suspension divided material to be graded up through the admission passage and the tank.

In testimony whereof I have hereunto signed my name in the presence of the two subscribed witnesses.

HALBERT K. HITCHCOCK.

Witnesses:
F. E. GAITHER,
ARCHWORTH MARTIN.